Dec. 21, 1943.  H. CHRISMAN ET AL  2,337,310
RECIPROCATING PISTON METER
Filed Dec. 12, 1940   3 Sheets-Sheet 1
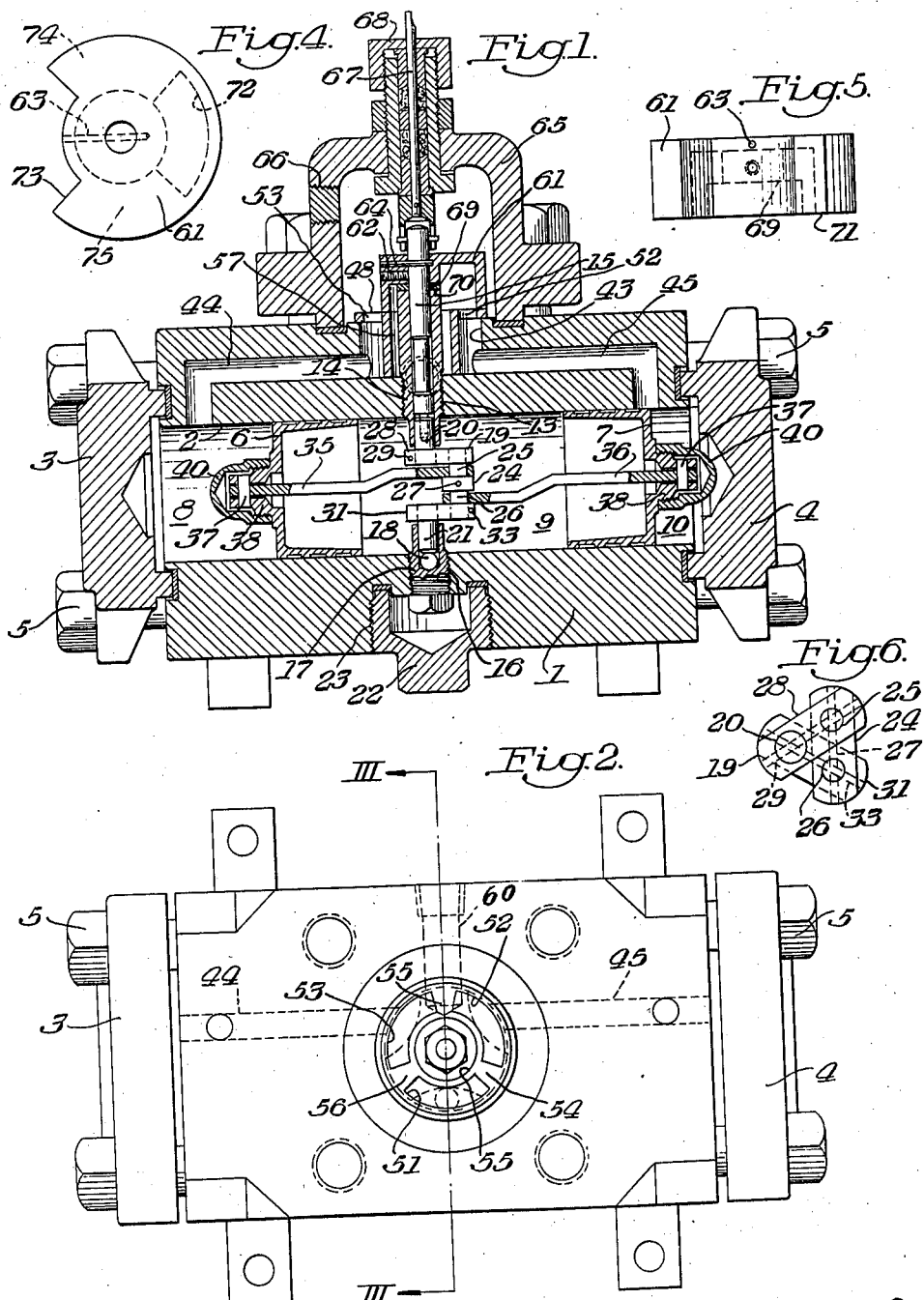
INVENTORS
Horace Chrisman
James F. Reid.
By Lewis D. Koningsford
ATTORNEY

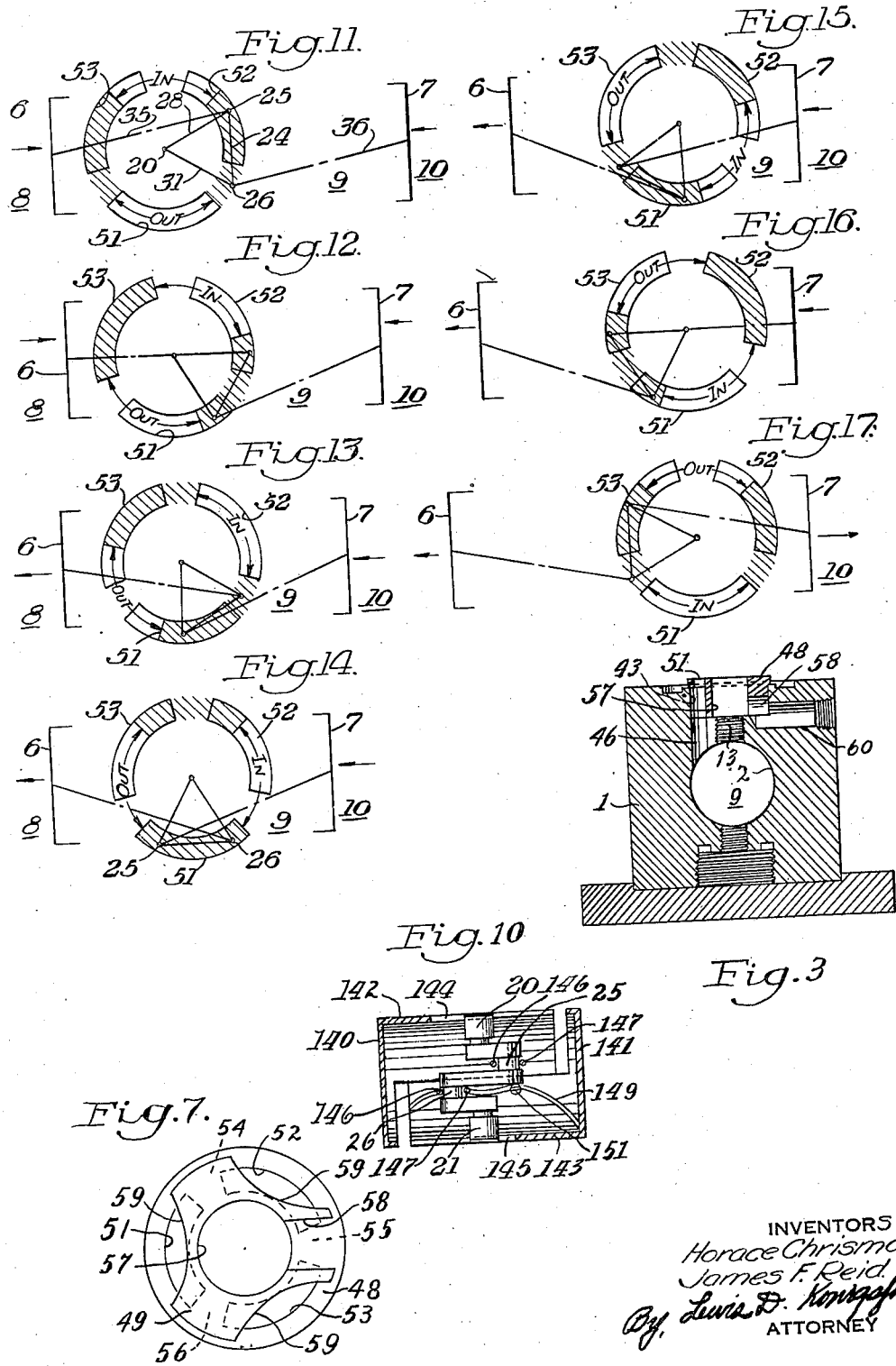

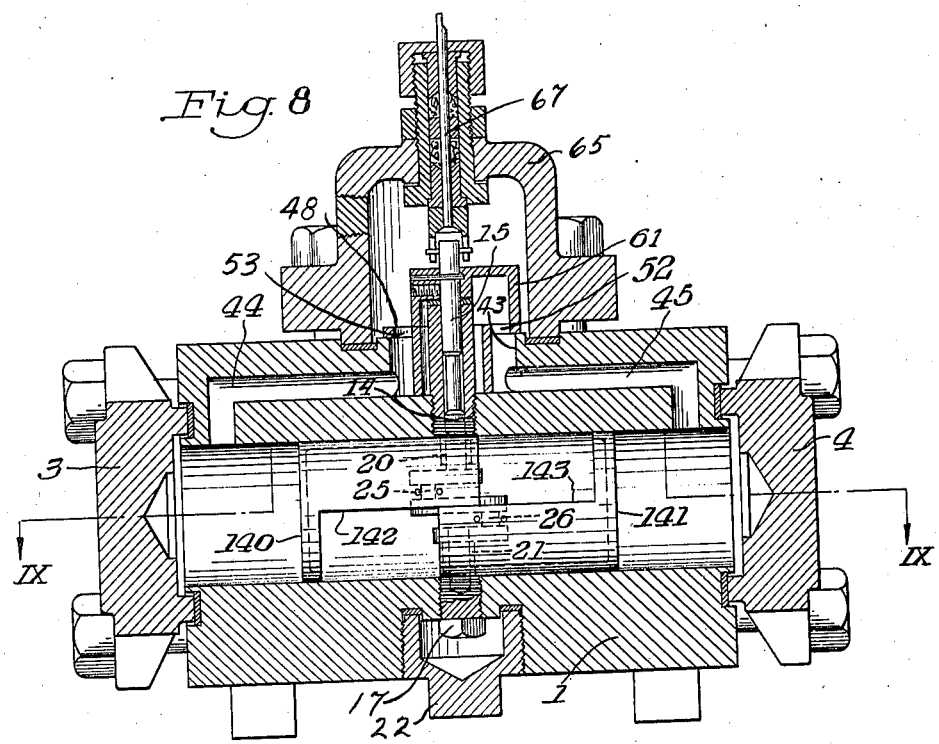
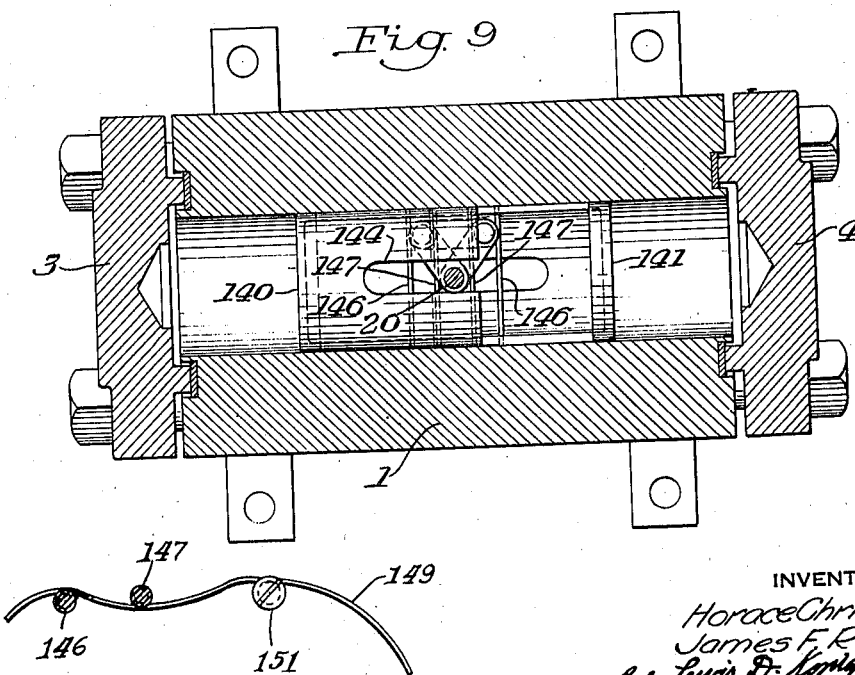

Patented Dec. 21, 1943

2,337,310

UNITED STATES PATENT OFFICE 2,337,310

RECIPROCATING PISTON METER

Horace Chrisman, Edgewood, and James F. Reid, Rosedale, Pa., assignors to Pittsburgh Equitable Meter Company, Pittsburgh, Pa., a corporation of Pennsylvania Application December 12, 1940, Serial No. 369,776

3 Claims. (Cl. 73—246)

This invention relates to positive displacement meters for measuring various kinds of fluids.

It is an object of this invention to produce a meter of the positive displacement type which will operate on a relatively small pressure head.

A further object is the provision of a meter which is compact and simple to make and assemble.

A further object is the provision of a piston meter in which the pistons and crank shaft can be assembled into a unit and the unit inserted in place or removed for disassembly.

A further object is the provision of a piston meter which is free running and has a smooth non-pulsating action.

These and other objects will be apparent upon consideration of the following specification taken in connection with the accompanying drawings showing preferred embodiments of the invention, and wherein, Figure 1 is a view in vertical section of an embodiment, Figure 2 is a plan view of Figure 1 with the valve and valve casing removed, Figure 3 is a vertical sectional view of the casing and valve seat of Figure 1 taken on line III—III of Figure 2, Figure 4 is a plan view of the valve, Figure 5 is a side view of the valve, Figure 6 is an end view of the crank assembly, Figure 7 is a bottom view of the valve seat, Figure 8 is a vertical sectional view of the preferred modification, Figure 9 is a horizontal sectional view of Figure 8 taken on line IX—IX, and Figure 10 is a vertical sectional view of the piston and crank assembly, Figures 11 to 17 are diagrammatic views illustrating the operation of the meter, and Figure 18 is an enlarged view of a detail of Figure 10.

Referring to the drawings (Figure 1), there is shown a casing 1 which preferably comprises a casting of suitable dimensions having a bore 2 therein running from end to end thereof closed at its ends by covers 3 and 4 which are secured in place by cap screws 5 threaded into the casing or in any other suitable manner. The bore 2 contains two pistons 6 and 7 and thus forms three chambers 8, 9 and 10 in which the pistons operate. One side of the casing is bored and tapped at 13 to receive a hexagonal bushing 14 therein which the valve driving shaft 15 is journalled. The other face of the casing is drilled and tapped at 16 to receive a recessed screw 17 having a ball 18 located therein. Crank member 19 has its stub shafts 20 and 21 journalled in the ends of bushings 14 and screw 17 and is coupled to the shaft 15 by means of a square tongue and square recess connection or in any other suitable manner. A cap 22 threaded in a recess 23 in the casing protects the screw 17.

Crank member 19 preferably is constructed as shown in Figures 1 and 6 with a middle connecting arm 24 having spaced pins 25 and 26 passing therethrough and held in place by a cross pin 27. The end of crank pin 25 enters one end of crank arm 28 which has the stub or shaft 20 secured thereto, a pin 29 holding the arm 28, pin 25 and shaft 20 assembled. Similarly pin 26 enters one end of crank arm 31 having the stub shaft 21 therein and which is held by a pin 33. Thus, the crank pins 25 and 26 are disposed at 60° from each other and from the stub shafts 20 and 21.

The pistons 6 and 7 have offset connecting rods 35 and 36, each secured at one end to its respective piston head by a pin 37 passing through the boss 38 and having a pressed fit therein. Caps 40 threaded on the ends of bosses 38 form a sealing fit with the heads of the pistons and enclose the ends of the connecting rods. At their other ends the connecting rods have bores which receive the crank pins 25 and 26, the connecting rods being assembled thereon before the crank assembly is pinned together. As the stub shafts 20 and 21 do not extend beyond the diameter of the bore 2, it will be apparent that the whole piston and crank assembly may be assembled outside of the casing and inserted or removed as a unit, by first removing the bushings 14 and 17.

The casing has a bore 43 in its upper surface surrounding bushing 14 which connects with passages 44 and 45 serving to supply and exhaust fluid to and from the ends of cylinders 8 and 10, and a vertical bore 46 (Figure 3) connects with the central chamber 9. The upper surface of the casing is machined to receive a flanged valve seat member 48 having a central boss 49 (Figure 7) which forms a sealing fit with the bore 43, and seat 48 has openings 51, 52 and 53 therein, separated by webs 54, 55 and 56. A central opening 57 surrounding bushing 14 is provided in the valve seat which connects with a recess 58 serving as an exhaust port. Boss 49 has recesses 59 therein and when the valve seat is assembled to the body, the opening 51 connects with supply bore 46 through a recess 59, opening 53 connects with supply passage 44 through another recess 59 and opening 52 connects with supply passage 45 through a third recess 59 while recess 58 connects with a lateral bore 60 in the casing (Figures 2 and 3) serving as the exhaust connection.

A valve member 61 is secured to the shaft 15 by means of a set screw 62 which allows adjustment of the timing thereof. In assembly the valve is first secured to the shaft 15 by the set screw 62 and when the timing is accurately adjusted a hole 63 (Figures 4 and 5) is drilled therethrough to receive the pin 64 by which the valve is rigidly secured to the shaft 15. The valve is surrounded by a cover 65 having an inlet port 66 therethrough, and a register driving shaft 67 passes through the stuffing box 68 of the cover and is coupled to the shaft 15 by a pin and slot connection or in any other suitable manner.

Preferably, the valve 61 has an under surface 69 which rests on a washer 70 located on top of bushing 14, thus allowing a running clearance on the order of a few thousandths of an inch between the top surface of valve plate 48 and the under surface 71 of the valve. The under surface of the valve has an opening 72 which is 90° in arcuate extent and is diametrically opposite recess 73 which also is 90° in arcuate extent. Thus two lands, 74 and 75 are provided which are 90° in arcuate extent, which co-operate with the ports 51, 52 and 53, each of which is 90° in arcuate extent separated by webs 54, 55 and 56, each of which are 30° in arcuate extent.

The operation now will be described with particular reference to the diagrammatic views in Figures 11 to 17, in which the parts diagrammatically shown are numbered according to Figures 1 to 7. When the pistons 6 and 7 are in the position shown in Figure 1, the crank assumes the position shown in Figure 6 and diagrammatically represented in Figure 11. In this position 30° of ports 52 and 53 are uncovered by the intake recess 73 so that fluid is being supplied to chambers 8 and 10, while exhaust opening 72 is in full communication with port 51. Pistons 6 and 7 are moving toward the center to reduce the size of chamber 9 and causing this chamber to exhaust. When the crank has moved 30° to the exhaust. When the crank has moved 30° to the position shown in Figure 12, piston 6 is at the inner limit of its stroke and port 53 is closed off completely by land 75. Piston 7 is still moving toward the center and port 52 is still connected by 60° to the intake recess 73. Port 51 is still exhausting as piston 7 is approaching piston 6. Upon another 30° movement of the crank the pistons have assumed the position shown in Figure 13, in which they are still approaching each other although moving in the same direction, and thus chamber 9 is still decreasing. Port 51 still is exposed 30° and is exhausting and port 53 now is exposed 30° and also is exhausting as the piston moves outward. Port 52 is completely uncovered and chamber 10 is still intaking. Upon another 30° movement the crank assumes the position shown in Figure 14 in which crank pins 25 and 26 are equidistant from the vertical center line. Pistons 6 and 7 now are moving toward the left at about the same speed so that the volume of chamber 9 is constant and port 51 now is completely closed. Port 53 is still exposed 60° and is exhausting and port 52 is uncovered 60° by intake recess 73 and is intaking.

Upon a further movement of 30° the crank assumes the position shown in Figure 15 in which the pistons are moving in the same direction but piston 6 now is moving faster than piston 7 and thus the chamber 9 is increasing in size. Thus, chamber 8 is still exhausting as port 53 is exposed, while chambers 9 and 10 are now intakposed, port 51 being exposed 30°. Upon further movement of 30° the piston 7 reaches the end of its stroke, as shown in Figure 16 and port 52 is completely covered, while port 51 is uncovered 60° and port 53 is exposed 60° to the exhaust outlet. Upon a further 30° turn piston 7 reverses its movement, as shown in Figure 17, and port 52 becomes exposed 30° to the exhaust outlet 12, while chamber 9 continues to intake and chamber 8 continues to exhaust. Upon a further 30° turn, piston 6 reaches dead center position, and port 53 becomes completely closed, while port 52 continues to exhaust and port 51 intakes. It is believed the operation of the meter will thus be clear without tracing through the other half of the cycle of operation.

In the modification shown in Figures 8, 9 and 10, wherein like parts are designated by like reference numerals, the pistons 140 and 141 have semi-cylindrical skirt portions 142 and 143 respectively with slots 144 and 145 therein into which extend the ends of shafts 20 and 21. The skirt portions prevent canting and guide the pistons in their movement. Each piston skirt has two rods 146 and 147 extending through the skirt to provide a slot between the rods in which the crank pins 25 and 26 are received, the pins being held in position by a spring wire 149 in each piston passing between rods 146 and 147 in circumferential grooves provided in the rods and bent upward under rod 147 and coiled about a screw 151, the free end of the spring being bent downward and abutting the piston head.

In operation the semi-cylindrical skirts 142 and 143 interfit so that when the pistons are in the position corresponding to Figure 14 they form a substantially continuous hollow piston, both pistons moving together for a small portion of the cycle of movement. This enables the meter to be made more compact, as there is no connecting rod needed to connect the pistons to the crank.

What we claim as our invention and desire to secure by United States Letters Patent is:

1. A piston meter comprising a casing having a bore therein, two pistons in said bore, end closures for said bore whereby three chambers are provided, a crank assembly comprising two stub shafts having crank pins therebetween, said crank assembly from the end of one stub shaft to the end of the other stub shaft being of a length less than the diameter of the bore, means connecting said pistons and crank pins and removable bearing members in said casing extending into said bore for journalling said stub shafts.

2. A piston meter comprising a casing having a bore therein, two pistons in said bore, end closures for said bore whereby three chambers are provided, a crank having crank pins disposed at an angle of sixty degrees, said pistons having transverse slots co-operating with the crank pins, and interfitting skirt portions, and a valve operated by said crank for controlling admission and exhaust of fluid from said chambers.

3. A piston meter comprising a casing having a bore therein, two pistons in said bore, end closures for said bore whereby three chambers are provided, a crankshaft having crank pins disposed therein, said pistons having transverse slots co-operating with the crank pins and interfitting skirt portions, and a valve operated by said crankshaft for controlling admission and exhaust of fluid from said chambers.

HORACE CHRISMAN.
JAMES F. REID.